(12) United States Patent
Shin et al.

(10) Patent No.: US 6,938,152 B2
(45) Date of Patent: Aug. 30, 2005

(54) COMPUTER AND CONTROL METHOD THEREOF

(75) Inventors: Seung-Gi Shin, Suwon (KR); Hyung-Han Lee, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 733 days.

(21) Appl. No.: 09/867,400

(22) Filed: May 31, 2001

(65) Prior Publication Data

US 2002/0062437 A1 May 23, 2002

(30) Foreign Application Priority Data

Nov. 17, 2000 (KR) ......................................... 2000-68611

(51) Int. Cl.⁷ .......................................... G06F 15/177
(52) U.S. Cl. ................. 713/2; 713/1; 713/320
(58) Field of Search ............... 713/1, 2, 100, 713/300, 320, 322, 323, 324

(56) References Cited

U.S. PATENT DOCUMENTS

| | | | |
|---|---|---|---|
| 6,104,304 A | | 8/2000 | Clark et al. |
| 6,282,667 B1 | * | 8/2001 | Nakazato ................... 713/324 |
| 6,393,559 B1 | * | 5/2002 | Alexander ................... 713/2 |
| 6,487,656 B1 | * | 11/2002 | Kim et al. ................... 713/2 |
| 2003/0154367 A1 | * | 8/2003 | Kawai ........................ 713/1 |

FOREIGN PATENT DOCUMENTS

| | | |
|---|---|---|
| JP | 06-51857 | 2/1994 |
| JP | 11-203141 | 7/1999 |
| KR | 14018/1993 | 7/1993 |
| KR | 47434/1999 | 7/1999 |
| KR | 8628/2000 | 2/2000 |

OTHER PUBLICATIONS

Scott Mueller, Upgrading and Repairing PCs, second edition, QUE, 1992, pp. 835–841.*

* cited by examiner

Primary Examiner—Dennis M. Butler
(74) Attorney, Agent, or Firm—Robert E. Bushnell, Esq.

(57) ABSTRACT

Disclosed are a computer including a basic input output system (BIOS) memory in which a BIOS for testing and controlling each component of the computer system at the time when power is supplied to the system and a control method thereof. The computer includes an sound command signal unit provided in the BIOS memory, generating a sound command signal according to a system state of the computer, a booting sound memory in which sound data is stored, and a booting sound controller for outputting the sound data in the booting sound memory to a speaker according to the sound command signal. Accordingly, even though a sound drive is not installed in the system, the computer can output a sound and a message in order to indicate the state of the computer, such as an initial booting, termination of a system and release of a power saving mode.

20 Claims, 7 Drawing Sheets ly, when the computer is being powered off, and when the computer is being released from a power saving mode, even though a sound driver is not installed in the computer system.

COMPUTER AND CONTROL METHOD THEREOF

CLAIM OF PRIORITY

This application makes reference to, incorporates the same herein, and claims all benefits accruing under 35 U.S.C. §119 from my application COMPUTER AND CONTROL METHOD THEREOF filed with the Korean Industrial Property Office on 17 Nov. 2000 and there duly assigned Ser. No. 68611/2000.

BACKGROUND OF THE INVENTION

1. Technical Field

The present invention relates to a computer and a control method thereof, and more particularly to a computer and a control method for outputting a sound and a message in order to indicate a state of the computer even though a sound driver is not installed in the system.

2. Related Art

Computer systems are information handling systems that are utilized by many individuals and businesses today. A computer system can be defined as a microcomputer that includes a central processing unit (CPU), a volatile memory, a non-volatile memory such as read only memory (ROM), a display monitor, a keyboard, a mouse or other input device such as a trackball, a floppy diskette drive, a compact disc-read only memory (CD-ROM) drive, a modem, a hard disk storage device, and a printer. A computer system's main board, which is a printed circuit board known as a motherboard, is used to electrically connect these components together. A computer system can be a desktop computer, a personal computer, a portable computer such as a notebook computer or palm-sized computer, or other type of computer.

One example of non-volatile memory is read only memory (ROM). Information stored in non-volatile memory can remain unchanged even when there is a power failure. The information stored in non-volatile memory will stay there until it is changed. Read only memory is used to store important information such as instructions for the central processing unit. There are different types of read only memory including electrically-erasable-programmable-read-only-memory (EEPROM) chip and flash-read-only-memory (flash-ROM). The flash-ROM can also be referred to as flash memory.

Computer systems include a basic input output system (BIOS) which is an especially important program stored in read only memory. The basic input output system tests a computer every time the computer is powered on. The basic input output system can allocate a computer system's resources automatically, making adjustments needed to accommodate new hardware. Also, the basic input output system governs how system board components interact.

When the computer system is powered on, the basic input output system immediately takes control of the computer system and its components. The first duty of the basic input output system is to perform a series of diagnostic routines called the power on self test (POST) routine, which ensures that every part of the computer system's hardware is functioning properly.

We have found that it can be inconvenient for a user to not receive a sound signal when the computer is being booted initially, when the computer is being powered off, and when the computer is being released from a power saving mode, even though a sound driver is not installed in the computer system.

We believe that it would be desirable for a sound signal to be output from the computer when the computer is being booted initially, when the computer is being powered off, when the computer is being released from a power saving mode, even though a sound driver is not installed in the computer system.

SUMMARY OF THE INVENTION

Accordingly, the present invention has been made keeping in mind the above-described problems, and it is an object of the present invention to provide a computer and a control method thereof, which can be applied to all kinds of system makers or operating systems (O/S), for outputting a sound and a message in order to indicate the state of the computer, such as an initial booting, termination of a system and release of a power saving mode even though a sound driver is not installed in the system.

This and other objects of the present invention may be accomplished by a provision of a computer including a BIOS memory in which a BIOS for testing and controlling respective system devices when power is supplied to a system thereof, the computer comprising a sound command signal unit provided in the BIOS memory, generating a sound command signal according to a system state of the computer; a booting sound memory in which sound data is stored; and a booting sound controller for outputting the sound data in the booting sound memory to a speaker according to the sound command signal.

The sound data preferably includes data depending upon the system state such as a booting message, a termination message and a power saving release message. Preferably, the computer further comprises an input unit for storing and deleting the sound data, and selecting the sound data according to the computer state, to thereby enable a user to select an output sound signal.

According to another aspect of the present invention, this and other objects may also accomplished by a provision of a control method for controlling a computer, the control method comprising the steps of storing sound data depending upon a system state of the computer; detecting the system state when power is supplied to the computer; generating a sound command signal depending upon the system state; and outputting the sound data according to the sound command signal.

To achieve these and other objects in accordance with the principles of the present invention, as embodied and broadly described, the present invention provides a computer apparatus, comprising: a basic input output system testing and controlling said computer apparatus when power is supplied; a basic input output memory being included in said basic input output system; a sound command signal unit provided in said basic input output system memory, generating a sound command signal according to a system state of said computer apparatus; a booting sound memory storing sound data; and a booting sound controller outputting said sound data in said booting sound memory to a speaker according to said sound command signal.

To achieve these and other objects in accordance with the principles of the present invention, as embodied and broadly described, the present invention provides a method for it controlling a computer, comprising: storing sound data depending upon a system state of a computer; detecting said system state when power is supplied to said computer; generating a sound command signal depending upon said detected system state; and outputting said sound data according to said sound command signal.

To achieve these and other objects in accordance with the principles of the present invention, as embodied and broadly described, the present invention provides a computer apparatus, comprising: a basic input output system testing and controlling said computer apparatus when power is supplied; a basic input output memory being included in said basic input output system; a sound command signal unit provided in said basic input output system memory, generating a sound command signal according to a system state of said computer apparatus; a booting sound memory storing sound data; and a booting sound controller outputting said sound data in said booting sound memory to a speaker according to said sound command signal, said sound data including at least one selected from among pre-recorded music data input by a user and pre-recorded spoken words.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE INVENTION

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, wellknown functions or constructions are not described in detail since they would obscure the invention in unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Figure 6:
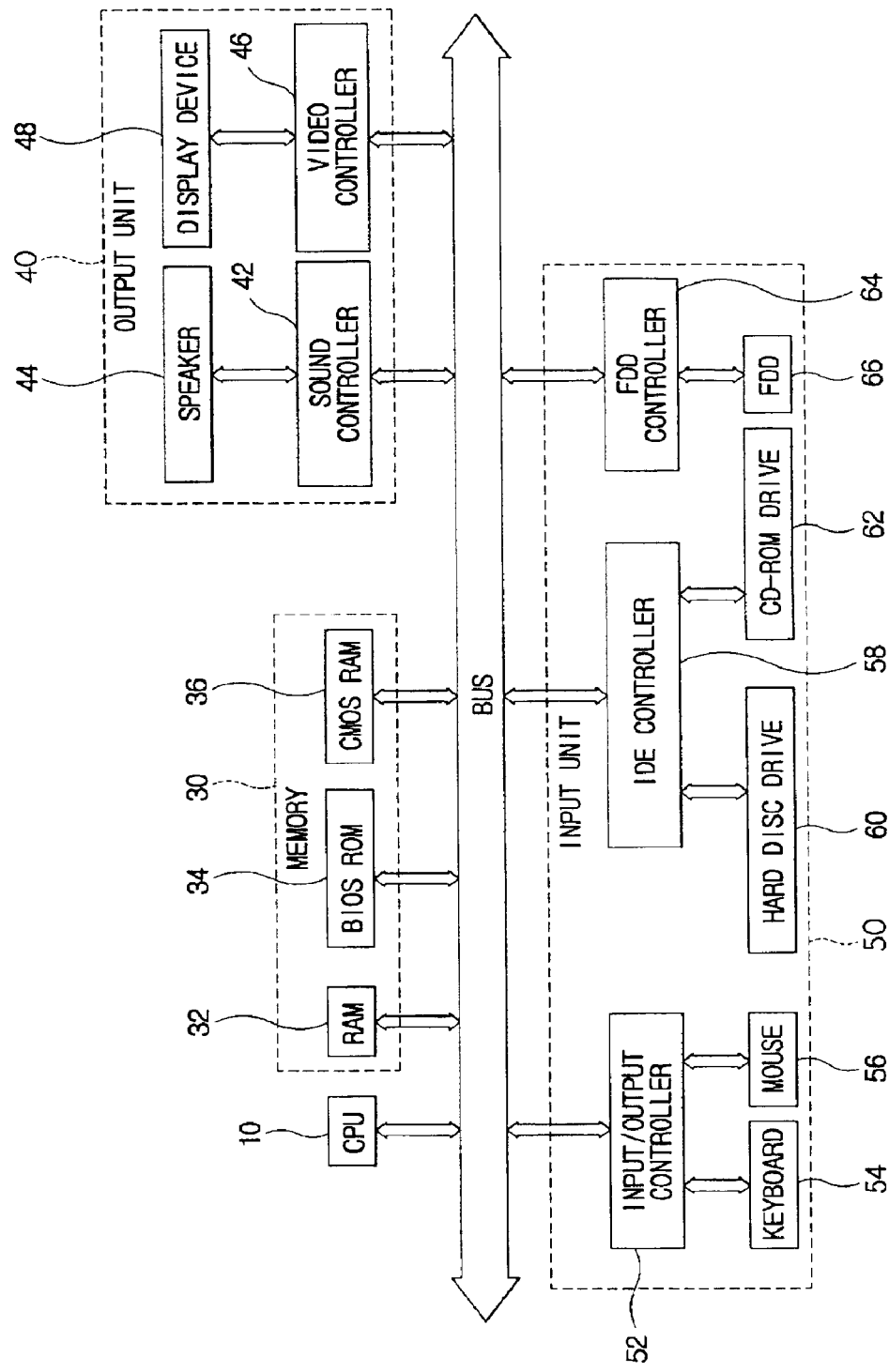
FIG. 6 is a block diagram showing a computer.

FIG. 6 is a block diagram for explaining a booting process of a computer. Referring to FIG. 6, the computer includes a central processing unit (CPU) 10, a memory 30, an output unit 40 and an input unit 50. The output unit 40 includes a video controller 46 and a display device 48 for a monitor output, a sound controller 42 and a speaker 44. The input unit 50 includes an input/output controller 52, an integrated drive electronics (IDE) controller 58, an floppy disk drive (FDD) controller 64, and a keyboard 54, a mouse 56, a hard disc drive 60, a compact disk read only memory (CD-ROM) drive 62 and a floppy disc drive 66 which are controlled by the above controllers 52, 58 and 64.

The memory 30 includes a random access memory (RAM) 32, a basic input output system read only memory (BIOS ROM) 34 and a complementary metal oxide semiconductor random access memory (CMOS RAM) 36. The BIOS ROM 34 is a non-volatile memory in which BIOS data with respect to the computer is stored. The BIOS is an internal software program for controlling and testing the system devices and performs a process called a power on self test (POST) in order to ascertain whether the system devices are correctly operated if power is supplied to the computer. The CMOS RAM 36 stores system configuration data of the computer therein. The BIOS compares the system configuration data obtained from the POST and the system configuration data stored in the CMOS RAM 36, during performing the POST process, and thus initializes and tests the respective system devices.

Figure 7:
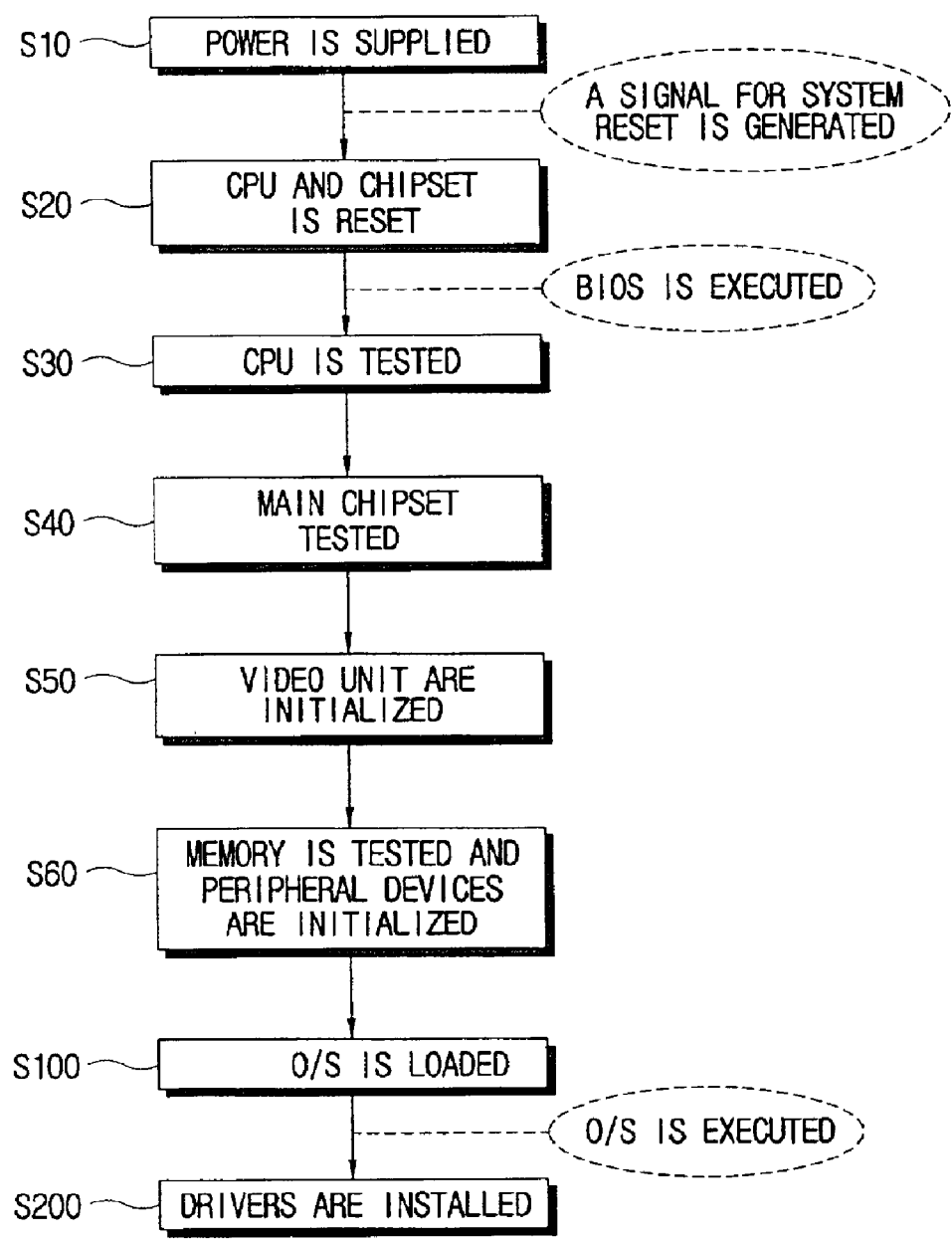
FIG. 7 is a flow-chart view illustrating a booting process in a computer.

A booting process of the computer having the above configuration is shown in FIG. 7. The computer booting process can be classified into a POST booting and a Windows booting. After having the above two booting processes, a user can use the computer at the Windows level.

If power is supplied to a computer (S10), a signal is generated from a chip for managing a system reset and thus the whole circuitry including the CPU 10 is reset (S20). The reset CPU 10 executes the BIOS stored in the BIOS ROM 34 immediately, to thus execute the POST process. In this first step of the POST process, the CPU 10 is internally tested. If the CPU 10 has been tested (S30), the CPU 10 normally operates. However, since an external chipset has not been initialized and tested, it cannot normally operate. Accordingly, if the CPU test has been completed, the main chipset is tested (S40). This step is not observed by the user. Thus, the video units 46 and 48 are initialized so that a picture is displayed on a screen (S50), and then the peripheral devices including the memory 30 and a hard disc are tested, in which the test procedures are displayed on the screen for user's information (S60). The above booting process is the initial booting procedure, which may be called a BIOS POST booting.

If there is no abnormality in the BIOS POST booting process, the BIOS loads an operating system (O/S) onto the memory (S100). The subsequent booting process proceeds by the operating system. After the operating system has been loaded onto the memory, various hardware device drivers are installed (S200). Only if the drivers should be successfully installed, the computer can operate normally. The above booting process may be called a Windows booting.

However, in the case that the computer is under the BIOS POST booting process which is the initial booting process (S10–S60) among the booting processes, the user should await until the system starts, and thus feel tiresome. Also, the user should watch the screen continuously in order to inspect the state of the computer.

In order to solve the above problem, a computer booting music generation method has been disclosed in a Korean Patent Laid-open publication 2000-8628. In this publication, a sound driver unit is firstly initialized during the POST process, to thereby provide a signal during the booting time. However, in order to test and install the sound driver, the sound driver should be initialized during the POST operation and then the remaining devices proceed under test, and thus, if the operating system starts to be loaded, operation of the sound driver is automatically suspended. The sound driver is re-installed by the loaded operating system and controlled by the operating system. Thus, the proceeding sequence of the POST should be changed in software, and a certain system maker or operating system may not support the above function. Further, the above publication invention can provide a sound signal only at the initial booting time.

Figure 1:
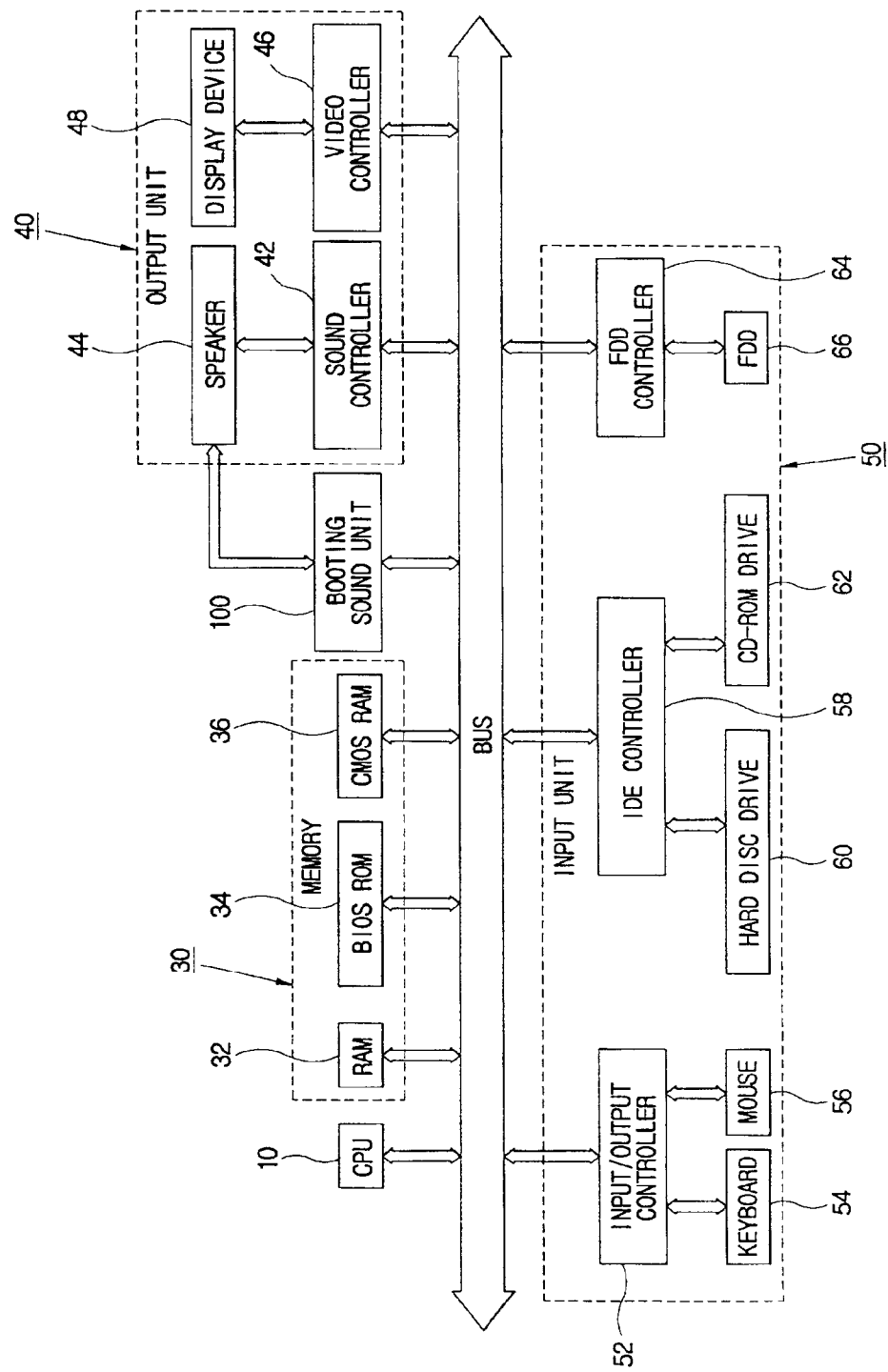
FIG. 1 is a block diagram showing a computer, in accordance with the principles of the present invention.

A preferred embodiment of the present invention will be described with reference to the accompanying drawings. As shown in FIG. 1 showing a block diagram of a computer according to the present invention, the computer further includes a booting sound unit 100 in addition to the above-described computer configuration. The configuration of the present invention except for the booting sound unit 100 is equivalent to that of the computer. Thus, the repetitive description thereof will be avoided, as necessary. The booting sound unit 100 is configured by different hardware from the sound controller 42 which is one of the devices in the computer, and controlled by a system BIOS. As described above, the BIOS is a program stored in the BIOS ROM 34, and is executed immediately when power is supplied, and performs the POST process to then inspect the respective devices of the computer. The booting sound unit 100 receiving a driving command directly from the BIOS is driven at the same time when power is supplied to the computer and the BIOS is executed, and provides a sound signal under the control of the system BIOS. Accordingly, the booting sound unit 100 operates separately from the POST booting and the Windows booting processes, and driven independently of the states whether or not the Windows is executed and thus the sound controller 42 has been installed, or the operating system or the other application program is executed.

Figure 2:
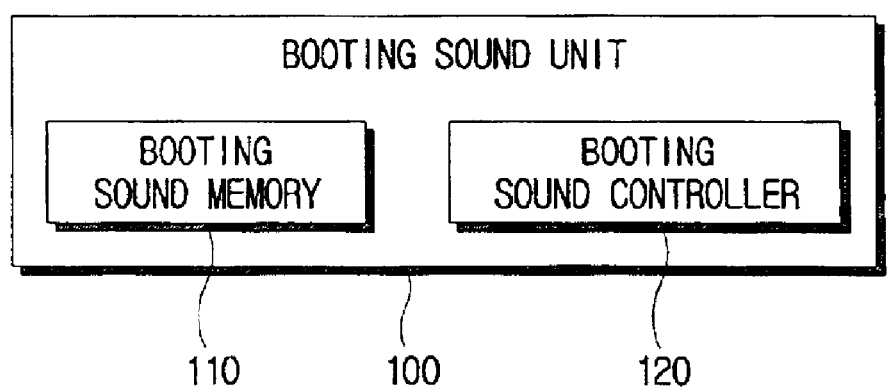
FIG. 2 is a block diagram showing a booting sound unit of FIG. 1, in accordance with the principles of the present invention.

As shown in FIG. 2, the booting sound unit 100 includes a booting sound memory 110 and a booting sound controller 120. Sound data such as sound, music, spoken words, and other audio data, are stored in the booting sound memory 110. The booting sound controller 120 outputs the sound data stored in the booting sound memory 110 via the speaker 44. Here, the booting sound controller 120 provides the sound data stored in the booting sound memory 110 according to a control signal of the system BIOS. The spoken words stored in memory 110 can be spoken by a user of the computer shown in FIG. 1 and recorded by the user, or the spoken words can be generated by a text-to-speech unit that converts words in a text file to audible speech data and then saves the audible speech data into the memory 110, or the spoken words can be spoken and recorded by a person other than the user of the computer shown in FIG. 1. The music data can be pre-recorded music data such as part of a song, or can be pre-recorded computer generated tones and other sounds.

Figure 3:
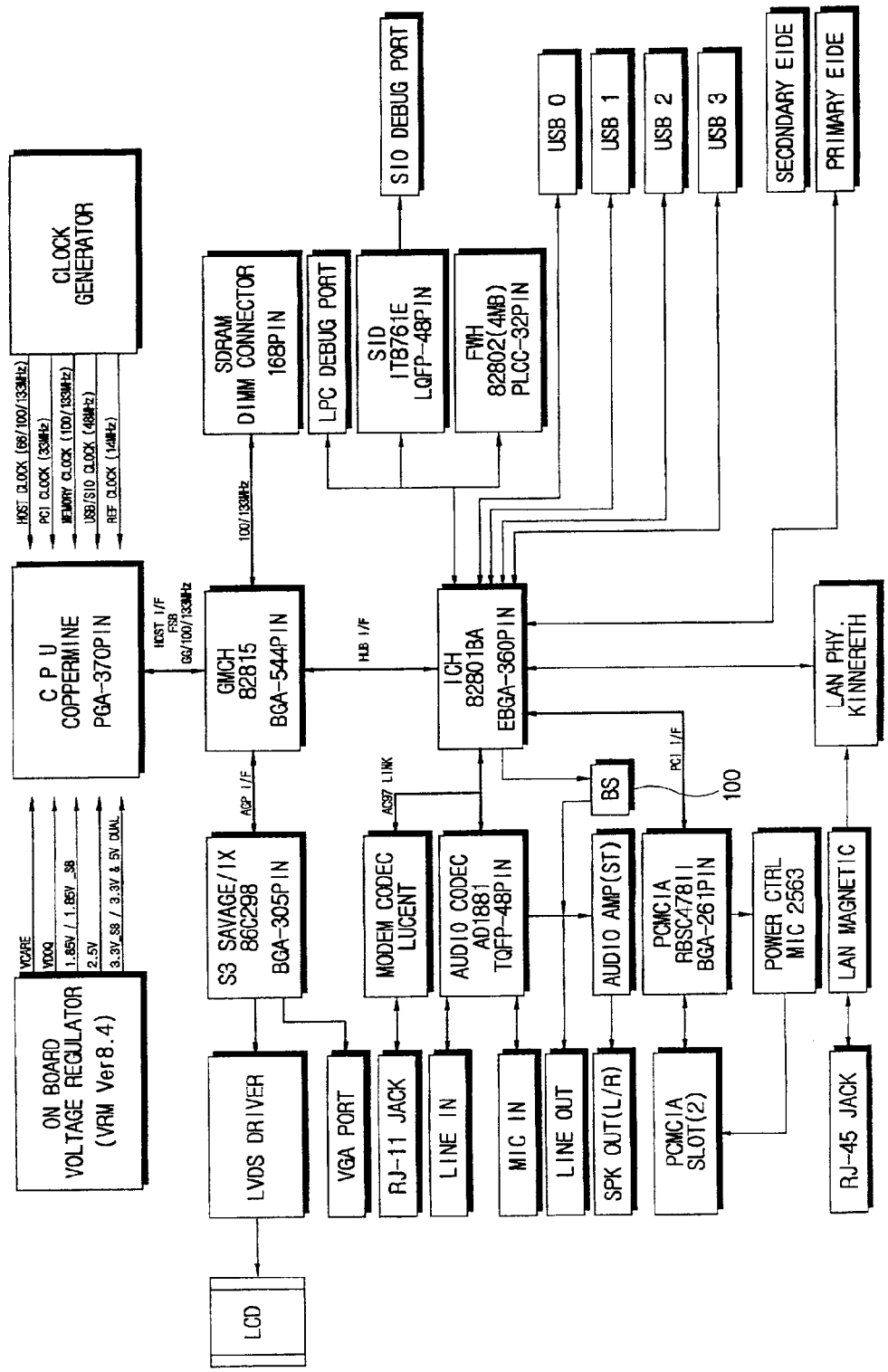
FIG. 3 is a block diagram showing a position of the booting sound unit in an actual circuit diagram, in accordance with the principles of the present invention.

FIG. 3 is a block diagram showing a position of the booting sound unit 100 in an actual circuit diagram. A block denoted as BS (booting sound) shows the booting sound unit 100 according to the present invention. As shown, the BS block being the booting sound unit 100 is connected to an ICH chip for performing the function of a South bridge chipset.

Figure 4:
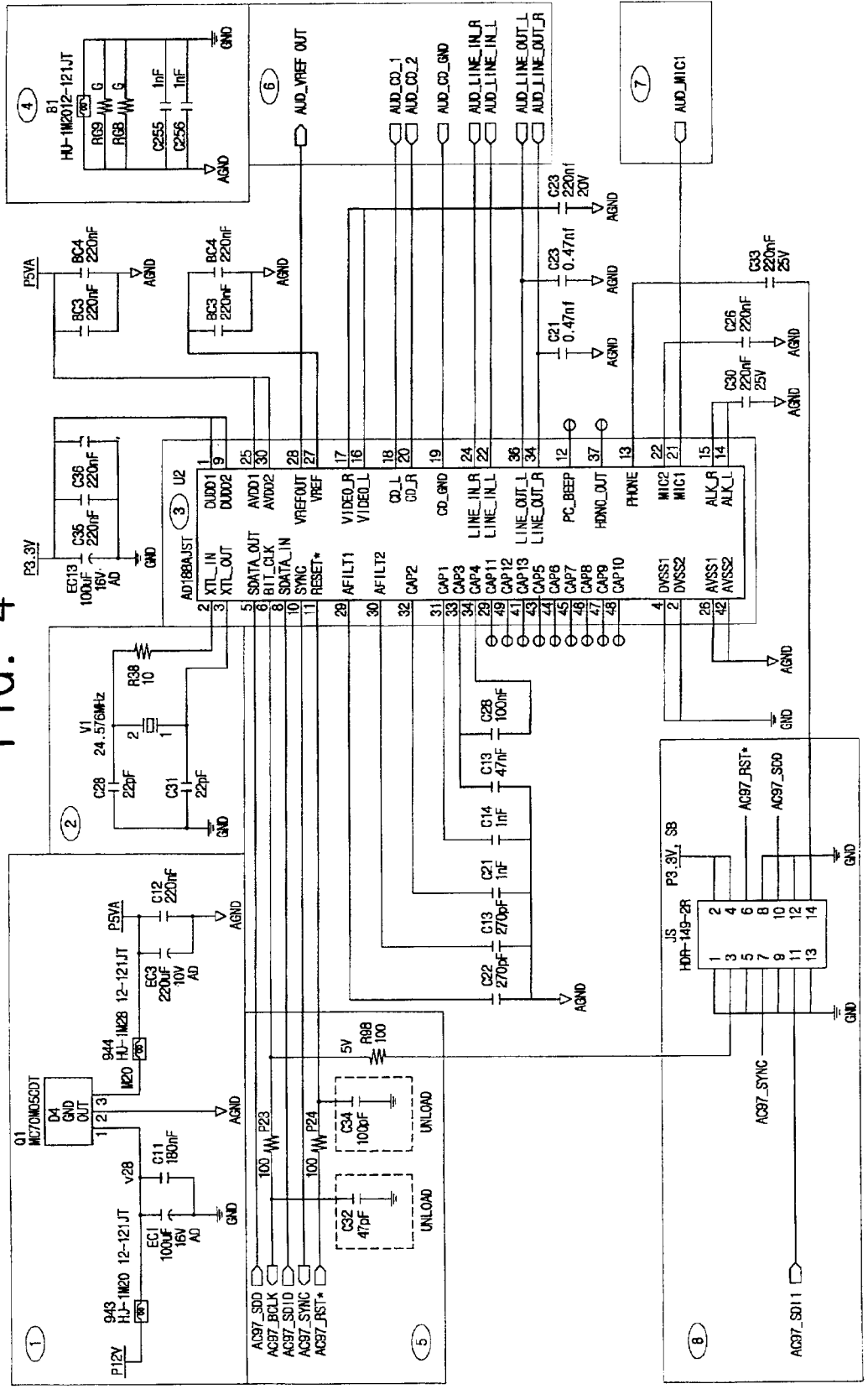
FIGS. 4 and 5 are actual circuit diagrams of the booting sound unit in the computer, in accordance with the principles of the present invention.
Figure 5:
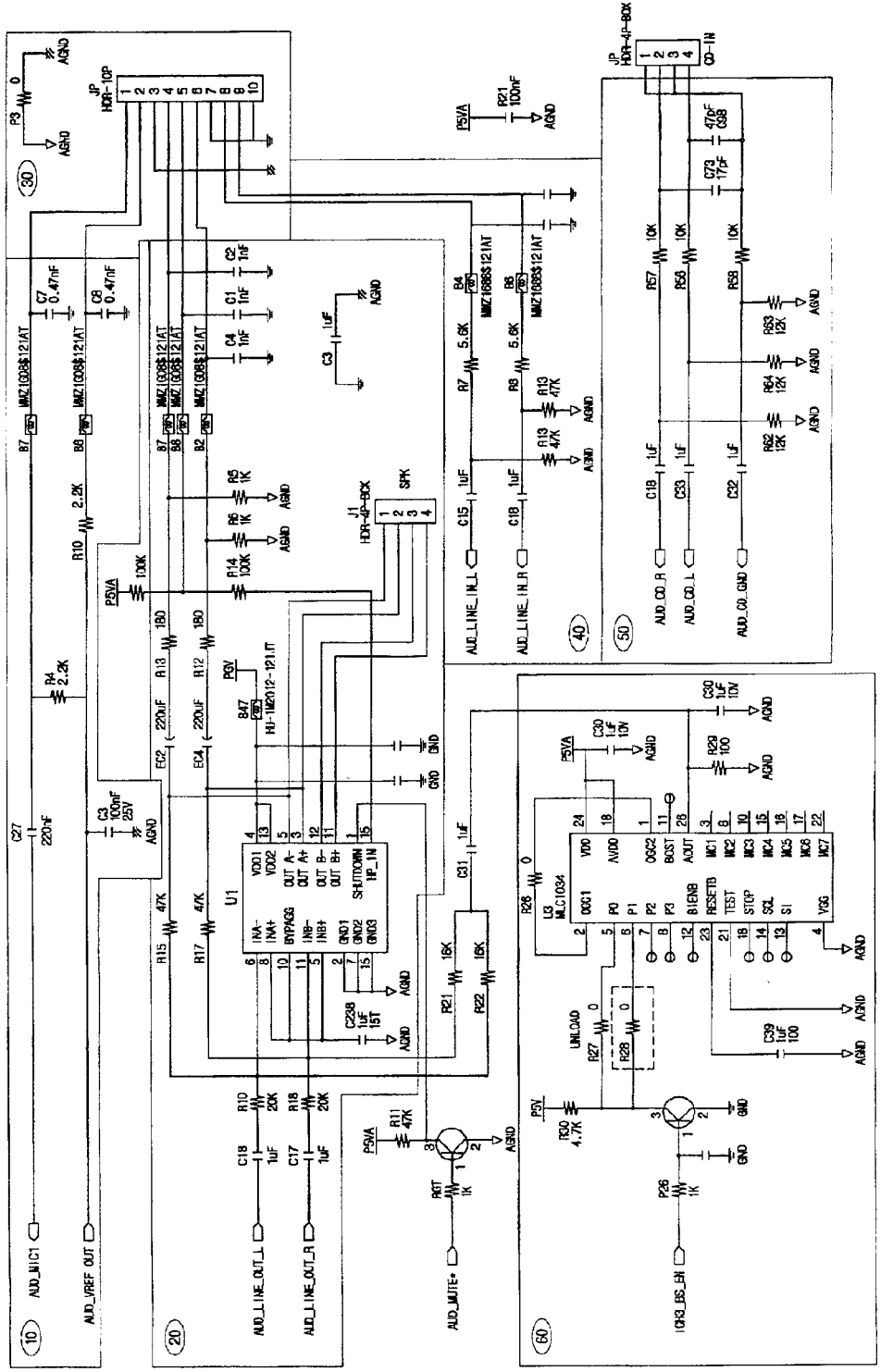

FIGS. 4 and 5 are actual circuit diagrams including the BS block of the booting sound unit 100 of FIG. 3 included in the computer according to the present invention. More specifically, the booting sound unit 100 corresponds to a block 60 of FIG. 5. If an ICH3__BS__EN signal is applied to U3 in the block 60 by the system BIOS, a sound signal stored in the ROM within the U3 is transmitted to U1 (output audio amplifier) to generate a sound.

A block 1 shown in FIG. 4 is a power supply unit, and supplies power to a block 3 of the U3 in the block 60. A block 2 is an oscillator and uses 24576 megahertz (MHz) at present, and a block 4 is used to remove noises in the signal, maintain stability and prevent electromagnetic interference (EMI). A block 5 is interfaced with an ICH2, with the AC97 method according to the current Intel 815E characteristic. That is, the booting sound controller 120 exists in the ICH2 chipset and only a codec (coder-decoder) portion exists in a separate chip as in U2, and is configured by 1881A of an analog device at present. A block 6 is used to transmit an audio of U2 to an amplifier, in which the block diagram of FIG. 4 is connected to that of FIG. 5. A block 7 is a microphone portion, and connected to a block 11 of FIG. 5. A block 8 is a connector for connecting a modem of an MR (Modem Rasire) type. In this embodiment, the modem function is also interfaced with the AC97 method.

A block 20 of FIG. 5 is a kind of an output amplifier which is used as an existing audio amplifier, and plays a role of amplifying a signal driven by U2 of FIG. 4. A control signal AUD_MUTE* shown in FIG. 5 is a control signal for muting sound signals in the case that a user or a system does not wish the sound signals, and is generated from ICH2. Blocks 30 and 50 are connectors, in which the block 30 is a signal connector connected to a microphone, a line-in terminal (line-in), and an external speaker terminal (ext-spk), and the block 50 receives a compact disk audio signal (CD-audio), that is, a sound signal according to the CD-ROM, and transmits the received signal to U2 of FIG. 4. A block 40 is a filter circuit for inputting a line-in signal (line-in).

As described above, the block 60 shown in FIG. 5 is a main circuit for outputting a booting sound signal. The main circuit is controlled by a control signal ICH3__BS__EN output from the ICH3. The control signal ICH3__BS__EN is one of GP10 signals generated by a routine determined by the system BIOS.

By the above configuration, if power is supplied to the computer, a signal is transmitted to a chip managing a system reset, and the whole circuitry including the CPU 10 is reset. The reset CPU 10 executes the BIOS immediately to drive the booting sound unit 100. The booting sound controller 120 receiving a driving signal from the BIOS outputs a sound signal stored in the booting sound memory 110 via the speaker 44. Accordingly, an initial booting process can be inspected only with sound. Here, the BIOS boots the computer in the manner of performing the POST and loading the operating system.

When the computer having the above configuration is actually used, a message for indicating that the system is currently being booted is provided via the speaker 44 at the same time when power is supplied to the computer by a user. That is, even in the case of performing the POST in the state that the operating system is not loaded, the system state can be provided as a sound message. It is also to provide the system state as music according to a user selection, or predetermined spoken words saved in memory. Likewise, when the system is intended to complete, the computer can provide only a system completion message to the monitor, while the present invention computer can provide the user with a sound message indicating that the system action has been completed.

A plurality of sounds can be saved in memory, in accordance with the principles of the present invention. For example, a first predetermined sound can be output from the computer when the computer is converted from a full power off state to a full power on state (initial booting). A second predetermined sound can be output from the computer when the computer is converted from a fall power on state to a full power off state. A third predetermined sound can be output from the computer when the computer is converted from a power save mode to a fall power on state. A fourth predetermined sound can be output from the computer when the computer is converted from a fall power on state to a power save mode.

Also, for example, when three different types of power save modes are available, there can be eight different predetermined sounds stored in the memory, with six of the eight being associated with the power save mode implementation. A first sound of the eight sounds can be output when the computer goes from fall power off to full power on (initial booting), and a second sound of the eight sounds can be output when the computer goes from full power on to full power off. The three different types of power save mode might correspond to standby, suspend, and hibernate, for example. Thus, a third sound selected from among the eight sounds is output when the first power save mode is activated, a fourth sound selected from among the eight sounds is output when the first power save mode is deactivated, a fifth sound selected from is among the eight sounds is output when the second power save mode is activated, et cetera.

More than three power saving modes can be available in a computer system. A computer may have a first set of power modes when receiving power from a battery, and a second set of power modes when receiving power from a source other than a battery. A user can customize a set of power save modes to instruct the monitor to turn off after 10 minutes of idle time, to instruct the hard drive to turn off after 15 minutes of idle time, to instruct the CPU to go into a slow speed mode to reduce power consumption after 5 minutes of idle time, to instruct the computer to hibernate after 20 minutes of idle time, for example. Idle time being time when a computer system is not receiving input from a keyboard or mouse, for example. Each of the particular power save modes within the aforementioned user-customized set can be associated with two sounds, one for activation of that mode and one for deactivation of that mode, if the user desires, in accordance with the principles of the present invention.

Meanwhile, most of the recent computers support a power saving function such as advanced configuration and power interface (ACPI) or advanced power management (APM). A suspend mode, a sleep mode, and a doze mode are provided as the power saving function. If there is no data input from an external data source for a designated time, only the minimum power is supplied for the power saving function and most of power is cut-off with respect to other devices. Thus, power is supplied to the circuitry indicating the CPU 10, as necessary, from the power saving mode to a normal mode. Here, since the drivers cannot be used for the time taken in supplying power to the respective drivers in order to return from the power saving mode to the normal mode, the user cannot see the system state temporarily. In this case, power is supplied to the booting sound unit 100 in order to solve the above problem, and the booting sound unit 100 is driven in the system BIOS, so that the computer can provide a message indicating that the system is releasing the power saving mode before the system returns to the normal mode. Also, the computer can provide a message indicating that the system is completed via the booting sound unit 100 after the operating system is perfectly completed at the time of the system completion.

Also, in the case that a user does not wish to drive the booting sound unit 100, setting of the system BIOS can be altered so that the message is not output.

In the above embodiment, the booting sound memory 110 stores a user's desired sound or music as desired therein, and stores necessary messages such as a booting sound signal, a completion sound signal, and a remotely booting sound signal according to the system state. Thus, for example, it is possible to insert an advertisement of a computer manufacturer therein and to output an advertisement message of the manufacturer at the time of the initial booting.

As described above, by providing in hardware the booting sound unit 100 controlled according to the system BIOS signal, the present invention provides the computer and the control method thereof, which are capable of providing a sound signal during the initial booting irrespective of the kind of the system maker or the operating system, and providing the computer state to the user with sound during completion of the system or conversion from the power saving mode to the normal mode.

As described above, the present invention provides the computer and the control method thereof, which can be applied to all kinds of system makers or operating system, for outputting a sound and a message in order to indicate the state of the computer, such as an initial booting, termination of a system and release of a power saving mode even though a sound driver is not installed in the system.

The foregoing paragraphs describe the details of a computer and a control method thereof, and more particularly, of a computer and a control method thereof, for outputting a sound and a message in order to indicate a state of the computer, such as an initial booting, termination of a system and release of a power saving mode, even though a sound driver is not installed in the system.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A computer apparatus, comprising:
   a basic input output system testing and controlling said computer apparatus when power is supplied;
   a basic input output memory being included in said basic input output system;
   a sound command signal unit provided in said basic input output system memory, generating a sound command signal according to a system state of said computer apparatus;

a booting sound memory storing sound data; and a booting sound controller outputting said sound data in said booting sound memory to a speaker according to said sound command signal, said sound data including at least one selected from among pre-recorded music data input by a user and pre-recorded spoken words.

2. The apparatus of claim 1, said spoken words being words spoken by the user.

3. The apparatus of claim 2, said sound data including a booting message, a completion message, and a power saving mode release message.

4. The apparatus of claim 3, further comprising an input unit storing and deleting said sound data, and selecting said sound data according to said system state.

5. The apparatus of claim 4, said system state of said computer apparatus being a transitional state selected from among a booting mode corresponding to a full power off mode being converted to a full power on mode, a completion mode corresponding to a full power on mode being converted to a full power off mode, and a power save release mode corresponding to a power save mode being converted to a full power on mode.

6. The apparatus of claim 5, said booting message being output during said booting mode, said completion message being output during said completion mode, and said power saving mode release message being output during said power save release mode.

7. The apparatus of claim 1, said system state of said computer apparatus corresponding to a transitional state selected from among a full power off mode being converted to a full power on mode, a full power on mode being converted to a full power off mode, a first power save mode being activated, a first power save mode being deactivated, a second power save mode being activated, a second power save mode being deactivated, a third power save mode being activated, and a third power save mode being deactivated.

8. The apparatus of claim 7, further comprising an input unit storing and deleting said sound data, and selecting said sound data according to said system state.

9. The apparatus of claim 8, said sound data including a plurality of different individual audio messages, each respective one of said individual audio messages corresponding to a respective one of said transitional states.

10. The apparatus of claim 7, said sound data including a plurality of different individual audio messages, each respective one of said individual audio messages corresponding to a respective one of said transitional states.

11. The apparatus of claim 1, said sound data including a booting message output during said booting mode, a completion message output during said completion mode, and a power saving mode release message output during said power save release mode.

12. A computer apparatus, comprising:

a basic input output system testing and controlling said computer apparatus when power is supplied;

a basic input output memory being included in said basic input output system;

a sound command signal unit provided in said basic input output system memory, generating a sound command signal according to a system state of said computer apparatus;

a booting sound memory storing sound data, said sound data including a booting message, a completion message, and a power saving mode release message; and a booting sound controller outputting said sound data in said booting sound memory to a speaker according to said sound command signal.

13. A computer apparatus, comprising:

a basic input output system testing and controlling said computer apparatus when power is supplied;

a basic input output memory being included in said basic input output system;

a sound command signal unit provided in said basic input output system memory, generating a sound command signal according to a system state of said computer apparatus, said system state of said computer apparatus being a transitional state selected from among a booting mode corresponding to a full power off mode being converted to a full power on mode, a completion mode corresponding to a full power on mode being converted to a full power off mode, and a power save release mode corresponding to a power save mode being converted to a full power on mode;

a booting sound memory storing sound data, said sound data including a booting message output during said booting mode, a completion message output during said completion mode, and a power saving mode release message output during said power save release mode; and a booting sound controller outputting said sound data in said booting sound memory to a speaker according to said sound command signal.

14. A computer apparatus, comprising:

a basic input output system testing and controlling said computer apparatus when power is supplied;

a basic input output memory being included in said basic input output system;

a sound command signal unit provided in said basic input output system memory, generating a sound command signal according to a system state of said computer apparatus;

a sound memory storing sound data; and a sound controller outputting said sound data in said sound memory to a speaker according to said sound command signal;

said sound data including a plurality of different individual audio messages, each respective one of said individual audio messages corresponding to a respective one of said transitional states.

15. A method for controlling a computer, comprising:

storing sound data depending upon a system state of a computer;

detecting said system state when power is supplied to said computer;

generating a sound command signal depending upon said detected system state;

outputting said sound data according to said sound command signal; and storing and deleting said sound data, and selecting said sound data according to said system state;

said system state of said computer apparatus being a transitional state selected from among a booting mode corresponding to a full power off mode being converted to a full power on mode, a completion mode corresponding to a full power on mode being converted to a full power off mode, and a power save release mode corresponding to a power save mode being converted to a full power on mode.

16. The method of claim 15, further comprising storing and deleting said sound data, and selecting said sound data according to said system state.

17. The method of claim 16, said sound data including a booting message output during said booting mode, a completion message output during said completion mode, and a power saving mode release message output during said power save release mode.

18. The method of claim 15, said sound data including a booting message output during said booting mode, a completion message output during said completion mode, and a power saving mode release message output during said power save release mode.

19. A method for controlling a computer, comprising:

storing sound data depending upon a system state of a computer, said system state of said computer apparatus being a transitional state selected from among a booting mode corresponding to a full power off mode being converted to a full power on mode, a completion mode corresponding to a full power on mode being converted to a full power off mode, and a power save release mode corresponding to a power save mode being converted to a full power on mode, and said sound data including a booting message output during said booting mode, a completion message output during said completion mode, and a power saving mode release message output during said power save release mode;

detecting said system state when power is supplied to said computer;

generating a sound command signal depending upon said detected system state; and outputting said sound data according to said sound command signal.

20. The method of claim 19, said sound data including a booting message output during said booting mode, a completion message output during said completion mode, and a power saving mode release message output during said power save release mode.

* * * * *